US009015782B2

(12) United States Patent
Acharya et al.

(10) Patent No.: US 9,015,782 B2
(45) Date of Patent: Apr. 21, 2015

(54) SIGNAL DISTRIBUTION SYSTEM WITH INTERRUPT PROCESSING AND TRICK PLAY FUNCTIONALITY

(75) Inventors: Swarup Acharya, New Providence, NJ (US); Bhawna Gupta, Edison, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 514 days.

(21) Appl. No.: 11/427,879

(22) Filed: Jun. 30, 2006

(65) Prior Publication Data
US 2008/0005770 A1    Jan. 3, 2008

(51) Int. Cl.
H04N 7/173 (2011.01)
H04N 21/433 (2011.01)
H04N 5/76 (2006.01)
H04N 21/2747 (2011.01)
H04N 21/61 (2011.01)
H04N 21/658 (2011.01)
H04N 21/6587 (2011.01)

(52) U.S. Cl.
CPC ....... *H04N 7/17318* (2013.01); *H04N 21/4333* (2013.01); *H04N 5/76* (2013.01); *H04N 7/17336* (2013.01); *H04N 21/2747* (2013.01); *H04N 21/6125* (2013.01); *H04N 21/6581* (2013.01); *H04N 21/6587* (2013.01)

(58) Field of Classification Search
CPC ................................................ H04N 7/18526
USPC .......................................... 725/101, 106, 102
See application file for complete search history.

(56) References Cited

U.S. PATENT DOCUMENTS

| RE34,895 E | 4/1995 | Morotomi et al. |
| 6,591,058 B1 | 7/2003 | O'Connor et al. |
| 7,103,906 B1* | 9/2006 | Katz et al. ........................ 725/87 |
| 7,266,610 B2* | 9/2007 | Futenma et al. .............. 709/231 |
| 7,636,544 B2* | 12/2009 | Yamada et al. ............... 455/3.01 |
| 7,886,056 B2* | 2/2011 | Collet et al. ................... 709/226 |
| 2001/0038690 A1* | 11/2001 | Palmer et al. ............. 379/218.01 |

(Continued)

FOREIGN PATENT DOCUMENTS

| JP | 2001-346137 | 12/2001 |
| JP | 2003111004 | 4/2003 |

(Continued)

OTHER PUBLICATIONS

RFC: 2326—Real Time Streaming Protocol (RSTP)—Apr. 1998.*

(Continued)

*Primary Examiner* — Junior Mendoza
(74) *Attorney, Agent, or Firm* — Ryan, Mason & Lewis, LLP (57) ABSTRACT

Methods and apparatus for recording programming content in a signal distribution system are disclosed. In one aspect of the invention, an interrupt is received, which may be associated with an incoming telephone call, email message, alarm or other type of message, and a corresponding interrupt indicator is presented on a user interface screen of a device such as television, laptop computer, mobile telephone, etc. Also presented on the user interface screen of the device is an activatable pause control that if activated initiates recording of a portion of the programming content that would otherwise be presented via the device absent activation of the pause control. Various trick play functions, such as pause, play, forward and rewind, may be provided utilizing the recorded portion of the programming content.

21 Claims, 5 Drawing Sheets

(56) References Cited

U.S. PATENT DOCUMENTS

| | | | |
|---|---|---|---|
| 2002/0056126 A1* | 5/2002 | Srikantan et al. | 725/87 |
| 2002/0124258 A1* | 9/2002 | Fritsch | 725/88 |
| 2002/0147988 A1* | 10/2002 | Nakano | 725/134 |
| 2003/0030751 A1 | 2/2003 | Lupulescu et al. | |
| 2003/0041332 A1* | 2/2003 | Allen et al. | 725/106 |
| 2004/0116118 A1* | 6/2004 | Karaoguz et al. | 455/432.3 |
| 2004/0128693 A1 | 7/2004 | Weigand | |
| 2004/0221304 A1* | 11/2004 | Sparrell et al. | 725/34 |
| 2004/0221305 A1 | 11/2004 | Broussard et al. | |
| 2004/0233281 A1 | 11/2004 | Tolmei | |
| 2004/0235492 A1 | 11/2004 | Chang et al. | |
| 2004/0259522 A1 | 12/2004 | Alicherry et al. | |
| 2004/0268404 A1 | 12/2004 | Gray et al. | |
| 2005/0091690 A1 | 4/2005 | Delpuch et al. | |
| 2005/0149966 A1 | 7/2005 | Fairhurst et al. | |
| 2005/0229213 A1* | 10/2005 | Ellis et al. | 725/58 |
| 2005/0246738 A1* | 11/2005 | Lockett et al. | 725/43 |
| 2005/0262541 A1* | 11/2005 | Oota | 725/100 |
| 2005/0281531 A1* | 12/2005 | Unmehopa | 386/46 |
| 2007/0053653 A1 | 3/2007 | Huntington | |
| 2007/0183744 A1 | 8/2007 | Koizumi et al. | |
| 2008/0205435 A1* | 8/2008 | Nahumi et al. | 370/463 |
| 2009/0298485 A1* | 12/2009 | Lee et al. | 455/414.3 |

FOREIGN PATENT DOCUMENTS

| | | |
|---|---|---|
| JP | 2004-186716 | 7/2004 |
| JP | 2004-248211 | 9/2004 |
| JP | 2004357138 A | 12/2004 |
| JP | 2005057475 A | 3/2005 |
| JP | 2005079790 A | 3/2005 |
| JP | 2005-253017 | 9/2005 |
| JP | 2005318250 A | 11/2005 |
| WO | WO03/019945 | 3/2003 |
| WO | PCT/US2007/014959 | 10/2008 |

OTHER PUBLICATIONS

U.S. Appl. No. 11/425,566, filed Jun. 21, 2006, Acharya et al., "User Interface Methods and Apparatus for Roaming Access to Subscription Services."

U.S. Appl. No. 11/399,872, Apr. 7, 2006, Acharya et al., "Delivery of Subscription Services to Roaming Users Through Head End Equipment."

U.S. Appl. No. 11/399,726, Apr. 7, 2006, Anurag Srivastava, "Method and Apparatus for Delivering Subscription Service Content to Roaming Users."

U.S. Appl. No. 11/145,832, Jun. 6, 2005, Acharya et al., "Signal Distribution System with User-Defined Channel Comprising Information from an External Network."

U.S. Appl. No. 11/130,329, May 16, 2005, Acharya et al., "Method and Apparatus for Providing Remote Access to Subscription Television Services."

* cited by examiner

SIGNAL DISTRIBUTION SYSTEM WITH INTERRUPT PROCESSING AND TRICK PLAY FUNCTIONALITY

RELATED APPLICATION(S)

The present application is related to U.S. patent application Ser. No. 11/130,329, filed May 16, 2005 and entitled "Method and Apparatus for Providing Remote Access to Subscription Television Services," U.S. patent application Ser. No. 11/145,832, filed Jun. 6, 2005 and entitled "Signal Distribution System with User-Defined Channel Comprising Information from an External Network," U.S. patent application Ser. No. 11/399,726, filed Apr. 7, 2006 and entitled "Method And Apparatus for Delivering Subscription Service Content to Roaming Users," U.S. patent application Ser. No. 11/399,872, filed Apr. 7, 2006 and entitled "Delivery of Subscription Services to Roaming Users Through Head End Equipment," and U.S. patent application Ser. No. 11/425,566, filed Jun. 21, 2006 and entitled "User Interface Methods and Apparatus for Roaming Access to Subscription Services," all commonly assigned herewith and incorporated by reference herein.

FIELD OF THE INVENTION

The present invention relates generally to signal distribution systems, and more particularly to techniques for providing features such as interrupt processing or trick play functionality within such systems.

BACKGROUND OF THE INVENTION

Conventional signal distribution systems include, by way of example, cable television systems, satellite television systems, and systems providing Internet protocol television (IPTV) over digital subscriber line (DSL) or fiber. Such systems are configured to distribute media streams associated with subscription television services to system subscribers or other users. Subscription television services are usually tied to a particular household or other predetermined subscriber location. Typically, a given subscriber is provided with an interface device, such as a set-top box or receiver, for communicating with system head end equipment. The interface device is configured to permit the subscriber to receive, on a television or other presentation device coupled to the interface device at a home location, the particular subscription television services to which that subscriber is entitled by virtue of the subscription. A given subscription may encompass, by way of example, a number of basic broadcast channels, as well as one or more premium programming channels, such as movie channels, sports channels, specialty channels, pay-per-view channels, on-demand video channels, etc.

A serious drawback of conventional cable, satellite and IPTV systems is that there is typically no roaming capability provided for subscribers. That is, subscribers generally must be at their respective home locations in order to receive the television services to which they have subscribed. By way of example, if a first subscriber leaves his or her home location and visits a remote location that also serves as a home location for a second subscriber, there is no mechanism provided for allowing the first subscriber to access his or her subscription television services at the second subscriber location. Thus, if the first subscriber has paid for access to a premium programming channel at his or her home location, that subscriber has no ability to access the premium programming channel at the remote location. This is the case even if the remote location, that is, the home location of the second subscriber, has the same television service provider and type of interface device as the home location of the first subscriber.

The above-cited U.S. patent application Ser. No. 11/130,329 discloses techniques which address and solve the remote accessibility problem. In one embodiment disclosed therein, an arrangement is provided whereby subscribers can access their usual home location subscription television services when at remote locations, without the need for carrying media devices, communications devices or other equipment to the remote locations.

Further advances in remote accessibility are described in the above-cited U.S. patent application Ser. Nos. 11/145,832, 11/399,726, 11/399,872 and 11/425,566.

Despite the considerable advances provided by the techniques described in the above-cited U.S. patent applications, a need remains for additional improvements in providing user accessibility to subscription television services or other content via cable, satellite and IPTV systems, as well as other types of signal distribution systems.

For example, conventional systems do not provide an ability to pause live programming content responsive to an indication of an incoming telephone call, email message or other type of interrupt. It would be desirable if a system were available that allowed a user to pause the live programming content, and subsequently resume reception of that content from the point of the pause on the same device or a different device.

SUMMARY OF THE INVENTION

The present invention in the illustrative embodiments provides techniques for implementing features such as interrupt processing and trick play functionality in a signal distribution system.

In accordance with one aspect of the invention, programming content is recorded in a signal distribution system responsive to receipt of an interrupt directed to a system user. The interrupt may be associated with an incoming telephone call, email message, alarm or other type of message. A corresponding interrupt indicator is presented on a user interface screen of a device such as television, laptop computer, mobile telephone, etc. Also presented on the user interface screen of the device is an activatable pause control that if activated initiates recording of a portion of the programming content that would otherwise be presented via the device absent activation of the pause control.

The programming content may comprise, by way of example, live television programming or other programming content of a selected one of a plurality of channels of a subscription service available to a system user at a home location of the user. The device may be at a location remote from the home location of the user, with the user accessing the selected channel via the device at the remote location. Such a user may register as a roaming user with the system via the device at the remote location.

The particular device utilized to present the user interface screen comprising the interrupt indicator and activatable pause control in the signal distribution system may be a television or other type of presentation device, and may be integrated with or separate from an interface device. For example, in one or more illustrative embodiments, a separate interface device in the form of a set-top box is utilized.

The recorded portion of the programming content may be stored in one of a number of different system entities. For example, the recorded portion of the programming content may be stored on the interface device or presentation device, or on a single device which includes both the interface device and the presentation device. As another example, the recorded portion of the programming content may be stored on a web server. The recorded portion of the programming content may also or alternatively be stored in head end equipment that serves the home location, or in head end equipment that serves the remote location.

In accordance with another aspect of the invention, trick play functions, such as pause, play, forward and rewind, may be provided utilizing the recorded portion of the programming content. For example, subsequent to activation of the above-noted activatable pause control, the user interface screen may be reconfigured to comprise at least one activatable trick play function control that if activated controls presentation of a recorded portion of the programming content via the device in accordance with the corresponding trick play function.

The illustrative embodiments advantageously facilitate the provision of interrupt processing and trick play functionality in a signal distribution system, particularly one which accommodates roaming users.

DETAILED DESCRIPTION OF THE INVENTION

The invention will be illustrated herein in conjunction with illustrative embodiments of signal distribution systems and associated interrupt processing and trick play functionality techniques. It should be understood, however, that the invention is not limited to use with the particular systems and techniques described, but is instead more generally applicable to any signal distribution application in which it is desirable to provide enhanced features such as interrupt processing or trick play functionality to system users. For example, although described herein primarily in the context of subscription television services, the techniques of the invention can also be adapted in a straightforward manner to subscription audio services, such as those delivered via digital satellite radio systems. Systems of the latter type are considered a type of signal distribution system as that term is used herein.

In one embodiment, a signal distribution system is configured to provide an ability to pause live programming content responsive to an indication of an incoming telephone call, email message or other type of interrupt. Such a system may, for example, allow a user to pause the live programming content, and subsequently resume reception of that content from the point of the pause on the same device or a different device. This pause feature may be provided in conjunction with other types of trick play functionality, such as forward, rewind, fast forward, fast rewind, etc.

The techniques of the illustrative embodiments are particularly well suited for use in conjunction with the provision of subscription services to roaming users, that is, users that access the services at locations other than their respective home locations. These embodiments will therefore be described in the context of roaming users. Nonetheless, it is to be appreciated that the described techniques can also be utilized by users at their respective home locations. Thus, roaming is not a requirement of the interrupt processing and trick play functionality techniques disclosed herein.

Figure 1A:
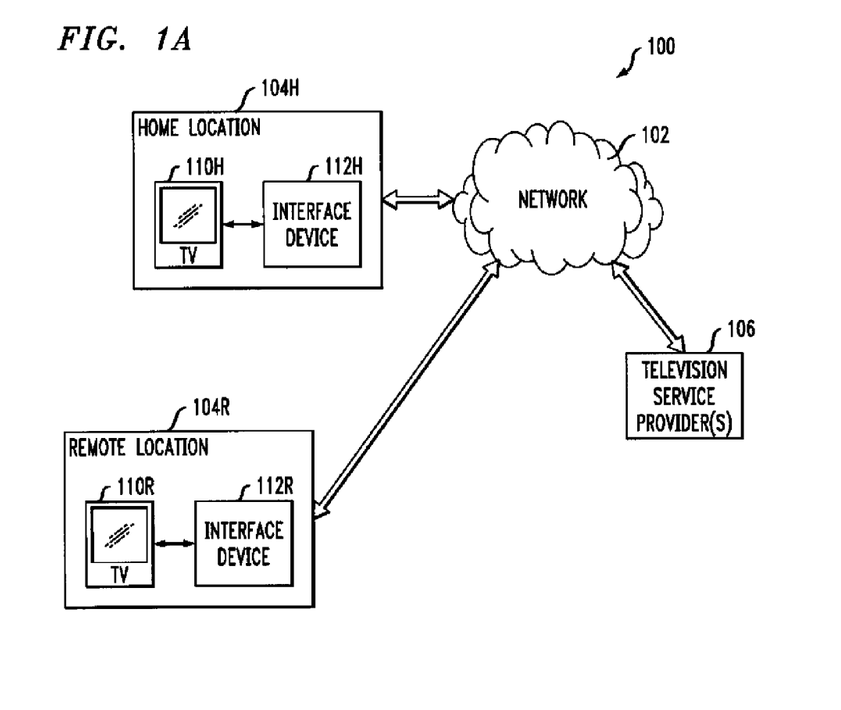
FIG. 1A shows an illustrative embodiment of a signal distribution system in accordance with the invention.

Referring now to FIG. 1A, a signal distribution system 100 comprises a network 102 over which equipment at a home location 104H and a remote location 104R communicates with one or more television service providers 106. The signal distribution system 100 may comprise, by way of example, a cable television system, a satellite television system, an IPTV system, or portions or combinations of these and other systems. Element 106 may comprise otherwise conventional service provider equipment, including, for example, head end systems, satellites, servers, etc. The equipment at the home location 104H comprises a television 110H coupled to an interface device 112H. Similarly, the equipment at the remote location 104R comprises a television 110R coupled to an interface device 112R. The interface devices 112 may comprise, for example, set-top boxes (STBs), receivers, computers, or other processor-based devices, in any combination.

The network 102 may comprise any type of communication network suitable for transporting signals associated with the provision of subscriber television services, and the invention is not limited in this regard. For example, portions of the network 102 may comprise local networks, wide area networks, the Internet, etc.

The home location 104H is a designated home location of a particular system subscriber. Thus, it is a location at which the subscriber is permitted to access one or more television services by virtue of his or her subscription. It should be noted that the term "subscriber" as used herein is intended to encompass other subscribing entities, such as businesses or organizations, in addition to individuals or families. Subscribers may be viewed as examples of what are more generally referred to herein as users, and the term "user" is thus intended to include subscribers as well as other types of users. Also, the term "home" should be construed broadly, and is not intended to be restricted to individual or family residences. Instead, the home location of a particular subscriber may be any location at which that subscriber ordinarily accesses television services in accordance with the subscription. A home location may therefore be at a business facility, hotel or other building, in a means of conveyance such as an automobile, train, bus or airplane, or at any other suitable location.

A home location for a given subscriber may serve as a remote location for another subscriber or subscribers. The remote location 104R therefore may be a home location for another system subscriber. Accordingly, remote location 104R, like home location 104H, is also equipped with a television and an interface device as shown. In other embodiments, the remote location need not be a home location for any particular subscriber. For example, the remote location may be a room or other area in a hotel or means of conveyance that is intended to serve multiple subscribers over a given period of time.

It is to be appreciated that the invention does not require any particular geographic relationship between the home location 104H and the remote location 104R. Accordingly, the two locations may be within the same local area, served by a common service provider. As another example, the two locations may be more geographically remote from one another, such as in different regions of the same country, or even in different countries, with the two locations being serviced by different television service providers. It is also possible that the home and remote locations may be in a common building or other structure, for example, in respective first and second apartments of an apartment building. Numerous alternative arrangements are possible, as will be apparent to those skilled in the art.

Figure 1B:
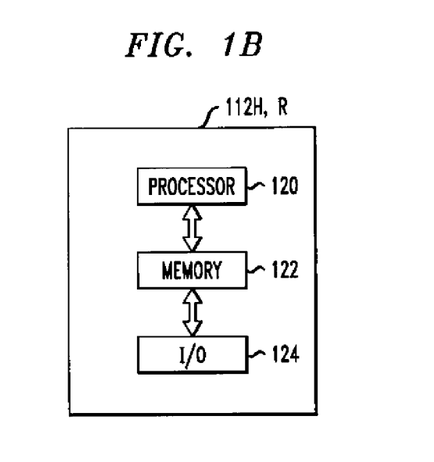
FIG. 1B shows a simplified block diagram of an interface device of the FIG. 1A system.

FIG. 1B illustrates that a given one of the interface devices 112H, 112R comprises a processor 120, a memory 122, and input/output (I/O) elements 124. The processor 120 may be, e.g., a microprocessor, a microcontroller, an application-specific integrated circuit (ASIC) or other type of processing device, as well as portions or combinations of such devices. The memory 122 may include an electronic random access memory (RAM), a read-only memory (ROM) or other type of storage device, as well as portions or combinations of such devices. The processor 120 and memory 122 are used in storage and execution of one or more software programs for implementing roaming television services techniques of a type to be described in greater detail below.

The particular signal distribution system configuration described above should be viewed as an illustrative example of a roaming television service arrangement in accordance with the invention, and it is to be understood that the invention can be implemented using other types and configurations of system components.

Additional details regarding the provision of roaming television services in a system such as that shown in FIG. 1A can be found in the above-cited U.S. patent application Ser. Nos. 11/130,329, 11/145,832, 11/399,726, 11/399,872 and 11/425,566.

The present invention in an illustrative embodiment deals with delivery of roaming television services via an IPTV system. It is to be appreciated that the described techniques can be extended in a straightforward manner to be implemented using other types of systems, such as cable or satellite television systems.

Generally, a roaming television services technique in this embodiment allows a subscriber to access his or her subscription television services when away from his or her designated home location. The roaming television services may be provided to a roaming user equipped with any type of interface device. Although the remote location interface device 112R in the FIG. 1A example is illustratively an STB, in other embodiments it may be a different type of interface device. Also, television 110R may be replaced with another type of presentation device, such as a computer, mobile telephone, personal digital assistant (PDA), wireless email device or any other type of device capable of presenting output associated with a roaming television service. It is also possible that the interface device and presentation device may be combined into a single device, as in an embodiment in which, for example, the interface device comprises a network interface of a computer, mobile telephone or other presentation device.

As noted previously, in other embodiments of the invention the roaming techniques may be applied to non-television services, such as subscription audio services delivered via digital satellite radio or other arrangements.

Figure 2:
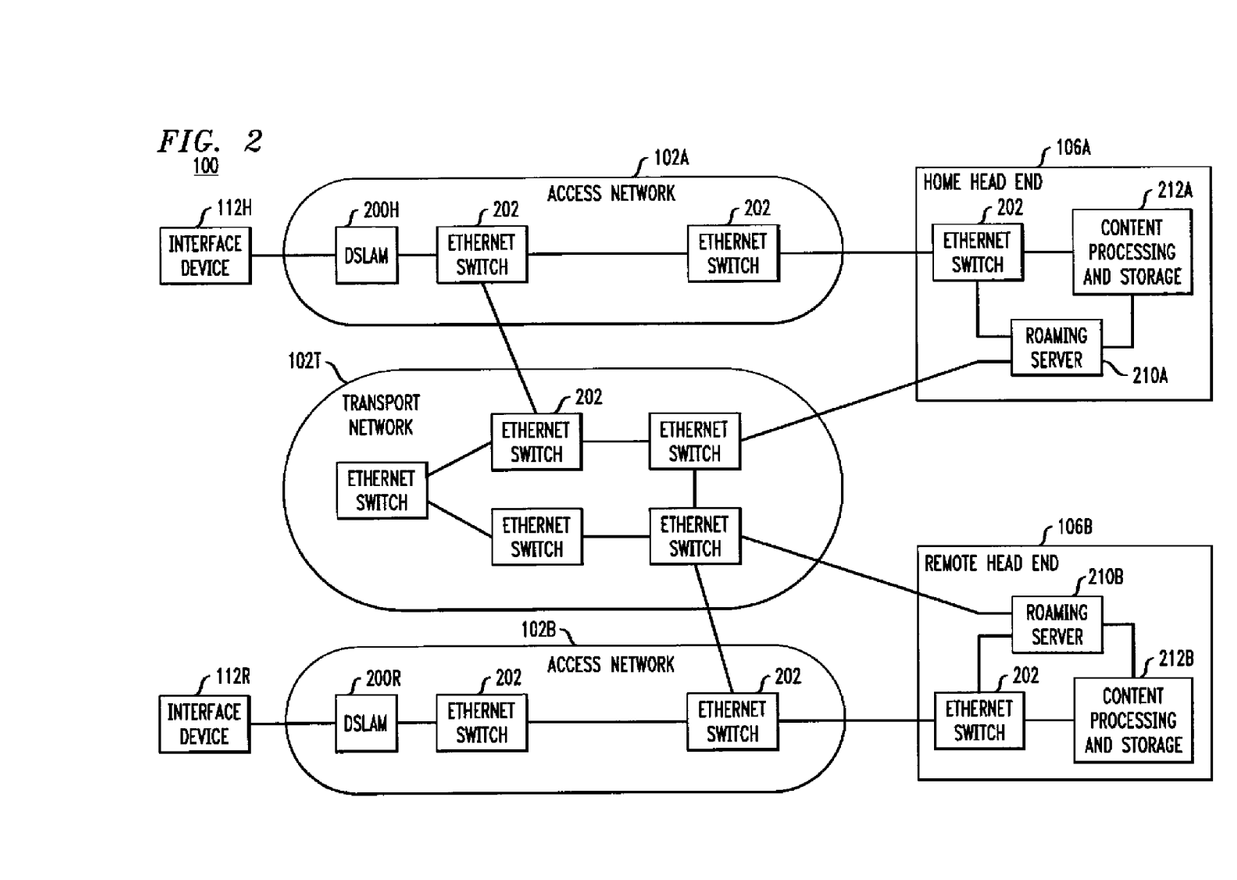
FIG. 2 is a more detailed view of one possible implementation of the FIG. 1A system for delivering roaming television services to a roaming user at a remote location.

FIG. 2 shows a more detailed view of one possible implementation of the system 100 for providing roaming television services via IPTV network head end equipment. The services are implemented at least in part in the form of software that is executed by system elements such as one or more interface devices and equipment of one or more television service providers. Although illustrated in the context of IPTV, the described services can be adapted in a straightforward manner for use in other types of signal distribution systems, such as cable and satellite television systems.

In the system 100 as shown in FIG. 2, home location and remote location interface devices 112H and 112R are coupled to respective digital subscriber line access multiplexers (DSLAMs) 200H and 200R in respective access networks 102A and 102B of network 102. The network 102 in this example further includes a transport network 102T. The access networks 102A and 102B and the transport network 102T each include multiple Ethernet switches 202, although other types of switches or routing elements may be used, in any combination. The particular interconnections among the switches 202 and their placement in particular networks or other elements of the system 100 is purely by way of illustrative example, and a wide variety of alternative arrangements may be used.

Also shown in the system are a home head end 106A and a remote head end 106B, both considered part of the television service provider(s) 106 of FIG. 1A. Each of these head ends comprises head end equipment including a roaming server 210 and a content processing and storage element 212. The head end equipment also includes an Ethernet switch 202 coupled to the corresponding access network. It is to be appreciated that the particular type of head end equipment as shown in FIG. 2 is merely an example, and may be altered in other embodiments. For example, the Ethernet switches in the head end equipment may be replaced with other types of switches or routing elements. Also, the roaming server may be combined with the content processing and storage element, or may be separated into other arrangements of elements providing similar functionality as described herein.

The servers 210A and 210n are referred to herein as "roaming" servers in that they are utilized in obtaining content for one or more roaming subscribers in system 100 and making that content available to the roaming subscribers. For example, as will be described in greater detail below, the roaming server 210B at the remote head end 106B may obtain content from the roaming server 210A at the home head end 106A in order to make such content available to a roaming user via remote location interface device 112R. The content processing and storage elements 212 may comprise otherwise conventional head end equipment for delivery of content to subscribers via the access networks 102A and 102B, such as controllers, signal combiners, databases or other storage devices, middleware, IPTV servers, local television acquisition servers, or other typical head end elements, in any combination.

A given subscriber may be viewed as having an associated home location channel lineup, representing the particular broadcast or premium programming channels, network personal video recorder (NPVR) channels, video-on-demand (VoD) channels, user-defined channels, or other types of channels that are available to the subscriber at his or her home location in accordance with a subscription service.

In the exemplary techniques to be described below, it is assumed that a subscriber has a "roaming profile" comprising a number of channels of the subscription service that are designated as being available to that subscriber at remote locations. The roaming profile may comprise all of the channels that are part of the above-noted home location channel lineup of the subscriber, or just selected ones of those channels. For example, the subscriber may be permitted to designate certain ones of the channels of the home location lineup for remote location access, via commands that are provided to the system using the home location interface device 112H.

A given subscriber may create multiple roaming profiles, for example, comprising different roaming profiles for different family members. Such an arrangement may be used to preserve the functionality of parental control for channels unsuitable for children. Each of the roaming profiles may have a different personal identifier number (PIN) or other access code associated therewith.

In order to receive roaming services at a given remote location, the user may be required to login or otherwise register with the system via a device at that location. In conjunction with such an access attempt, the user may enter, for example, an account number and the above-noted PIN or other access code in order to obtain access to home location content associated with the corresponding roaming profile.

In the illustrative embodiments to be described in greater detail below, interrupt processing and trick play functionality are provided. For example, as will be described, a given interrupt, such as an interrupt associated with a received incoming telephone call, email message, short message service (SMS) message, alarm, or the like, is processed in a head end of the system and a corresponding indicator is presented to the user via a user interface screen of a television or other presentation device. The system presents in conjunction with the indicator one or more activatable icons or other controls that permit the user to pause the content being presented at that time. Such a pause function is an example of what is more generally referred to herein as a trick play function. Other trick play functions that may be provided in a given embodiment of the invention include, for example, play, forward, fast forward, rewind, fast rewind, resume, continue, etc. in any combination. Thus, the trick play functions may include those commonly associated with an otherwise conventional personal video recorder.

Figure 3:
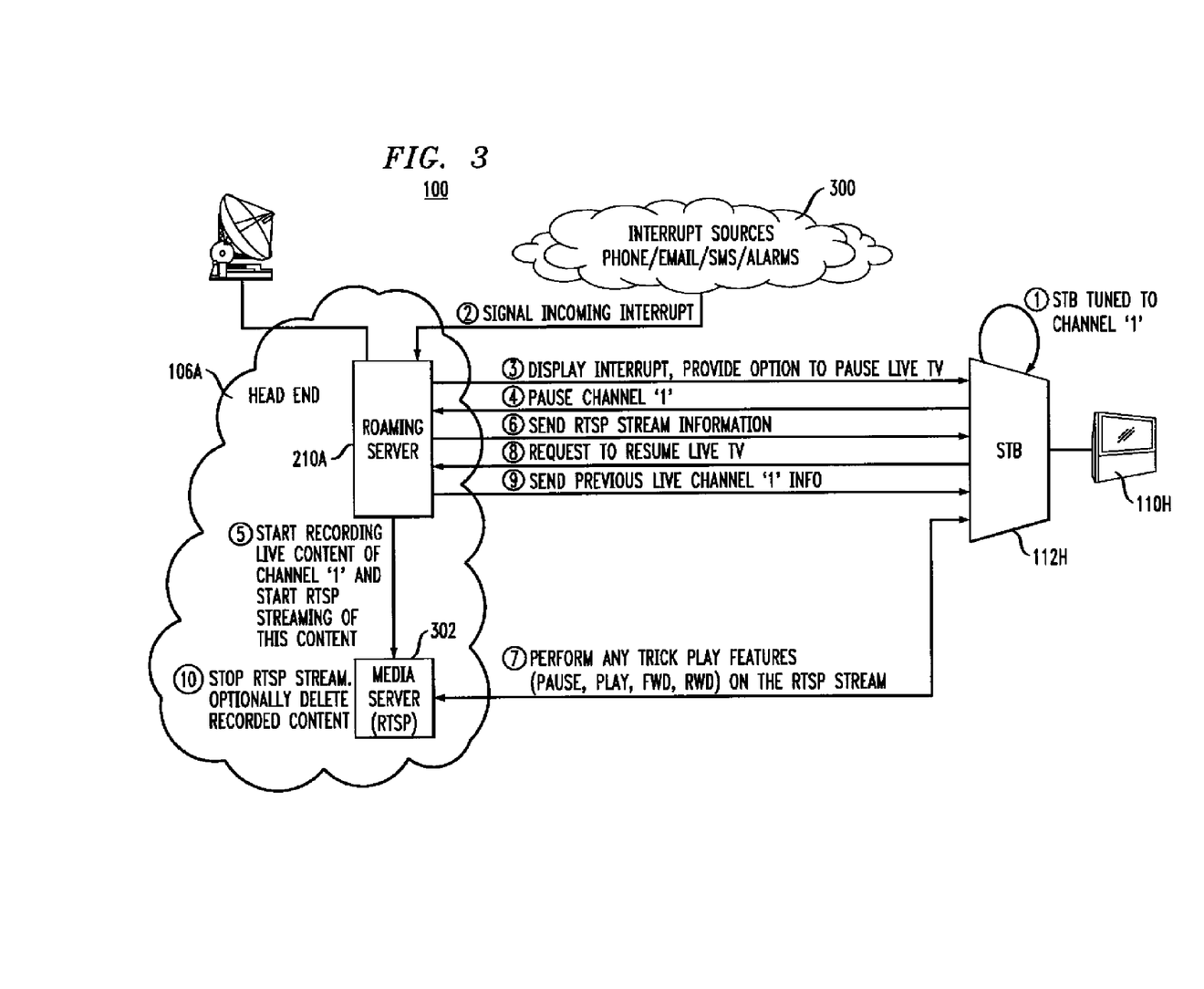
FIG. 3 is a diagram illustrating one example of the manner in which interrupt processing and trick play functionality can be provided in the FIG. 1A system.

Referring now to FIG. 3, a diagram is shown illustrating one example of the manner in which interrupt processing and trick play functionality can be provided in the system 100 of FIG. 1A. In this particular example, it is assumed that these features are provided at a home location 104H of a given user, via the roaming server 210A at the corresponding head end 106A, but the described techniques can be extended in a straightforward manner to support roaming users at respective remote locations in the system 100.

The portion of the system 100 as shown in FIG. 3 includes one or more interrupt sources 300. As indicated above, such sources may comprise sources of telephone calls, email messages, SMS messages, alarms, etc. The sources may comprise, for example, elements of the service providers 106, such as telephone systems, email servers, message servers, and so on, or other system elements coupled to network 102. One or more of the interrupt sources may be external to the system. The system in the present embodiment is configured to process interrupts from any type of source, without limitation.

Also included in the head end equipment associated with head end 106A in this example is a media server which illustratively runs Real Time Streaming Protocol (RTSP). Such a media server may be, for example, part of the content processing and storage element 212A of the head end 106A, or a separate stand-alone element. In other embodiments, the media server may be implemented in a system element other than the head end, that is, may be implemented external to the head end. Also, a wide variety of other types of protocols may be used in place of or in addition to RTSP.

The FIG. 3 diagram illustrates Steps 1 through 10 associated with interrupt processing and trick play functionality in this example.

In Step 1, the interface device 112H, illustratively an STB, is tuned to a particular channel, such as Channel 1. In roaming contexts, this channel may be a roaming channel that is part of the roaming profile of a given user.

In Step 2, an incoming interrupt is signaled to the roaming server 210A from one of the interrupt sources 300.

A given interrupt can be directed by the roaming server to a particular STB in a number of different ways. For example, each STB may be identified by a unique IP address or other type of address. The interrupt may then be broadcast by the roaming server with the STB address and the intended STB can then pick up the interrupt and all other STBs of the system can ignore it. As another example, the interrupt may be unicast to the appropriate STB as determined by the roaming server if the system supports unicasting. Such an arrangement may be particularly efficient in an IPTV environment.

In Step 3, the roaming server directs the interrupt to the STB 112H for presentation on the television 110H, and instructs the STB to provide a trick play option, namely, an option to pause the "live" television programming associated with Channel 1. It should be noted that the term "live" in this context is intended to refer to the typical broadcast programming which would normally be provided to subscribers tuned to Channel 1 at a given point in time, as opposed to content recorded by the system responsive to activation of the pause option.

Figure 4A:
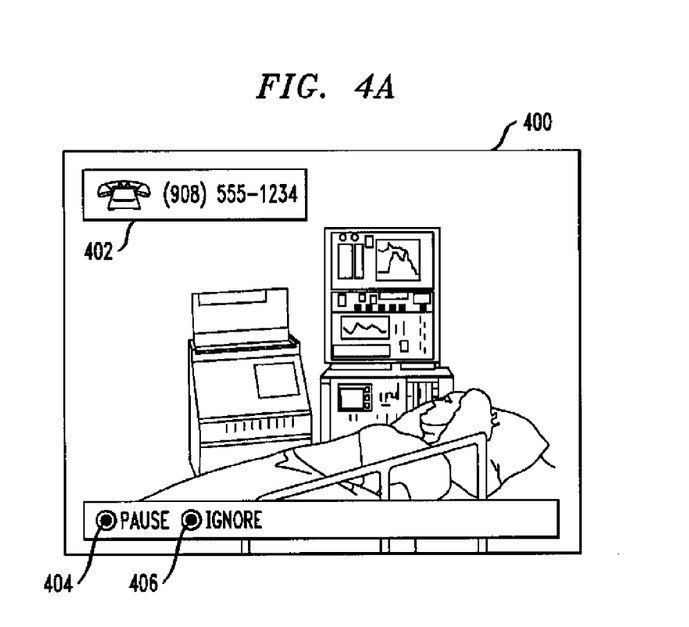
FIGS. 4A and 4B show examples of user interface screens that may be presented to users via televisions or other presentation devices of the system of FIG. 1A.

FIG. 4A shows a user interface screen 400 that may be presented to the user via the STB 112H and television 110H at this stage of the FIG. 3 process. The screen includes, illustratively shown as superimposed on a particular frame of the video associated with the live television programming, an indicator 402 which identifies the particular interrupt. Of course, the indicator 402 will generally be maintained over multiple video frames, such that its presence is made apparent to the user. In the present example, the indicator specifies that the interrupt is a telephone call from an originating number (908) 555-1234. The originating number may be determined using caller identification information in a conventional manner, and such a determination may be made internal or external to the system 100.

Also presented as part of the user interface screen 400 are activatable icons 404 and 406 associated with respective Pause and Ignore functions. Thus, the user interface provides the user with the option to pause the Channel 1 live television programming currently being viewed on television 110H, so that the user can attend to the interrupt. The user interface also provides the user with the option to ignore the interrupt. If the Ignore icon is activated, the interrupt indicator and the associated Pause and Ignore icons are removed and the screen returns to its normal display of the Channel 1 live television programming.

Of course, numerous other arrangements may be used for collectively presenting the interrupt indicator, the associated activatable icons and the television programming. For example, instead of superimposing the interrupt indicator and the activatable icons on the video as in FIG. 4A, the video may be reduced in size and the interrupt indicator and activatable icons presented above or below the reduced-size video window. As another example, the separate Pause and Ignore icons may be eliminated and the interrupt indicator itself may serve as an activatable icon. More particularly, the interrupt indicator can be presented, and if activated, the pause feature is invoked, but if not activated for a designated period of time, the indicator is automatically removed.

After a user selects or otherwise activates the Pause icon 404 in user interface screen 400, a modified version of the screen, or an entirely separate screen, may be provided which presents a Resume icon. This modified or separate screen is not shown in the figures. Activation of the Resume icon instructs the system to resume presentation of recorded television programming for the corresponding channel, that is, Channel 1 in the present example, from the point of the initiation of the pause operation.

The activatable icons 404 and 406, and others described herein, can be accessed and activated in a well-known conventional manner, for example, by using keys on a remote control device at the particular location. Activatable icons should be viewed as illustrative examples of what are more generally referred to herein as activatable controls, and such controls can use any of a variety of well-known mechanisms for their presentation, access and activation, including remote control devices as noted above, a computer mouse or other point-and-click device, a stylus, etc.

Returning to FIG. 3, it is assumed at this stage of the process that the user response to the presentation of user interface screen 400 is activation of the Pause icon, indicating that the user would like to pause the live television programming of Channel 1 so as to service the interrupt by, for example, answering the telephone call.

In Step 4, the instruction to pause Channel 1, initiated by user activation of the corresponding Pause icon 404, is conveyed from the STB 112H to the roaming server 210A.

In Step 5, the roaming server 210A starts recording the content of Channel 1 and directs the media server 302 to start RTSP streaming of this recorded content, also referred to herein as "paused content." Paused content thus refers to content that is recorded responsive to receipt of a pause instruction. It is assumed without limitation that the roaming server has access to all the available content at the head end and can record the appropriate program stream(s) when required.

In Step 6, the RTSP stream information is sent from the roaming server 210A to the STB 112H, which processes it for presentation on the television 110H. Alternatively, such RTSP stream information may be sent directly to the STB from the media server, effectively bypassing the roaming server 210A.

Figure 4B:
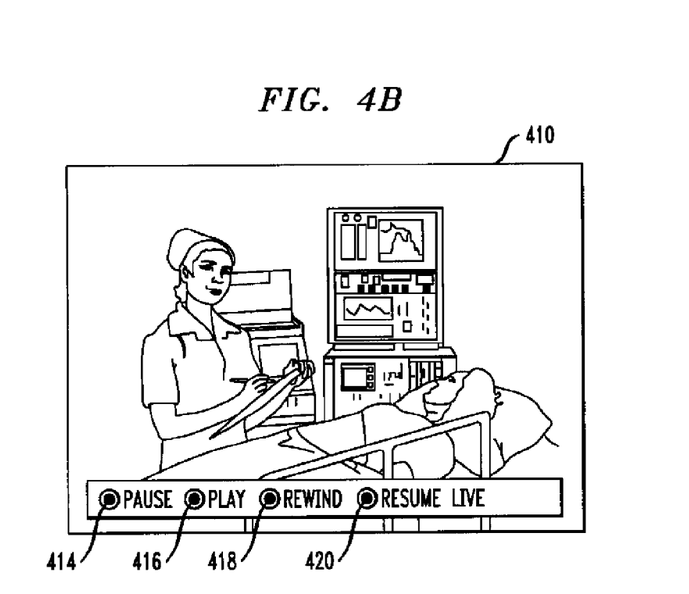

In Step 7, in conjunction with the recording of the live television programming, one or more trick play features may be performed on the RTSP stream responsive to user commands. As noted above, such features may include pause, play, forward, fast forward, rewind, fast rewind, etc. These features may be initiated via a user interface screen such as screen 410 as shown in FIG. 4B. The screen 410 in the present example includes activatable icons 414, 416 and 418 for respective Pause, Play and Rewind trick play features, although others, such as forward, could also be included. This screen may be presented, for example, responsive to user activation of the above-noted Resume icon, not shown in the figures. As indicated above, the Resume icon may be presented responsive to user activation of the Pause icon 404 in the user interface screen 400 of FIG. 4A. Thus, in the present example, the user can begin playback of the paused stream immediately after he or she has completed servicing of the interrupt. The paused programming can also be stored with appropriate indexing for later viewing.

The screen 410 further includes a Resume Live icon 420 which is used to direct the system to resume presentation of the live television programming for the selected channel. Again, the term "live" in this context is used to distinguish typical programming presented to subscribers from, for example, content recorded responsive to the above-noted pause option. The resumption of the live television programming results in the presentation of the content that is being broadcast over the selected channel at the current time. It should be noted that information associated with the various trick play options such as pause, play, forward and reverse may be sent directly to the media server 302 as part of otherwise conventional RSTP communications.

In Step 8, a request to resume live television programming is transmitted from the STB 112H to the roaming server 210A, responsive to activation of Resume Live icon 420.

In Step 9, the roaming server 210A resumes sending the live television programming of the selected Channel 1 to the STB 112H for presentation on television 110H. Again, resumption of live television programming picks up with the programming as of the current time.

In Step 10, the media server 302 stops the RTSP stream. Any recorded content may be deleted, or as indicated above may continue to be stored for later viewing.

The particular steps shown in FIG. 3 and their performance sequence should be viewed as exemplary only. For example, in other embodiments, Steps 9 and 10 may be performed in the reverse order.

An intelligent application or other software program may be downloaded to the STB to provide enhanced support of the above-described capabilities, thereby reducing the amount of interaction with servers 210A and 302 that is required.

The particular example of FIG. 3 is in the context of an IPTV system. However, as noted previously, the disclosed techniques can be adapted in a straightforward manner for use in other types of signal distribution systems, such as cable and satellite television systems. For example, similar process steps may be used in a cable system, with the use of RTSP being replaced by an arrangement in which a different channel assignment is used to handle a paused stream and any associated trick play functions, with the STB tuning to the different channel and then later switching back to the original channel.

The user interface screens as shown in FIGS. 4A and 4B can be generated in a straightforward manner using otherwise conventional programming techniques that are well understood by those skilled in the art. For example, the screens can be generated using one or more software programs that are executed using processor and memory elements associated with the home or remote locations. Other system elements, such as head end equipment, may also be utilized in the generation of these screens. Again, it is to be appreciated that the particular screens shown are presented by way of example only, and may be replaced with numerous other types and arrangements of user interfaces appropriate for carrying out the described functionality.

Figure 5:
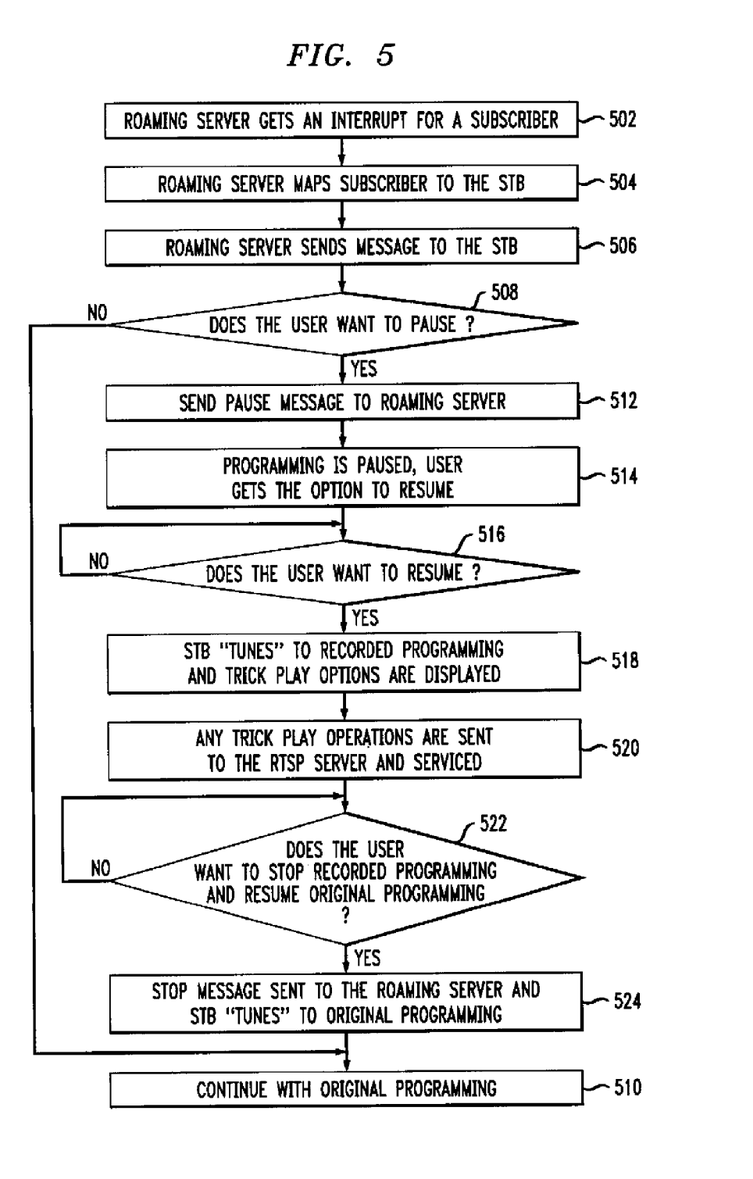
FIG. 5 is a flow diagram of an interrupt processing and trick play functionality technique in an illustrative embodiment.

FIG. 5 shows the steps associated with an exemplary interrupt processing and trick play functionality technique in an illustrative embodiment. This process may be implemented in the system 100 as shown in FIGS. 1A and 2, using arrangements of the type previously described in conjunction with FIGS. 3, 4A and 4B. The process will be described with reference to the elements of FIGS. 3, 4A and 4B.

In step 502, the roaming server 210A receives an interrupt for a particular subscriber. The roaming server then maps the subscriber to an STB, namely, STB 112H in the present example, and sends the interrupt message to that STB, as shown in steps 504 and 506, respectively. The interrupt may be presented along with a pause option using a user interface screen such as screen 400 of FIG. 4A. Step 508 determines if the user wants to pause. If the user does not want to pause, the roaming server continues to present the normal live television programming, as indicated in step 510. Otherwise, the pause message is sent from the STB to the roaming server in step 512.

Upon receipt of the pause message from the STB, the roaming server 210A pauses the live television programming, and provides the user with an option to resume the programming, as shown in step 514. This option may be presented, for example, via the above-noted Resume icon presented on a separate or otherwise reconfigured screen not explicitly shown in the figures. Such a screen may be presented responsive to activation of the Pause icon 404 in screen 400 of FIG. 4A.

Step 516 determines if the user wants to resume presentation of the television programming from the point of the pause, based on whether or not the user has selected or otherwise activated the corresponding Resume icon as noted above. If not, the process remains in step 516. Otherwise, the process proceeds to step 518, where the STB "tunes" to the recorded programming and displays icons for activating respective ones of the various available trick play options, if such icons are not already displayed. Such icons, as shown in the exemplary screen 410 of FIG. 4B, may include a Resume Live icon 420 as well as various trick play function icons such as Pause, Play and Rewind icons 414, 416 and 418, respectively.

The term "tune" in this context may refer to tuning a different frequency channel, for example, in the cable television context, but is intended to be construed more generally so as to also encompass any adjustment or reconfiguration of the STB to display different programming. In this particular example, the live television programming that would otherwise be displayed is replaced with recorded programming that was recorded responsive to the pause operation. Any trick play operations that are initiated with respect to the recorded programming are sent to the RTSP server and serviced, as shown in step 520.

A determination is then made in step 522 as to whether the user wants to stop presentation of the recorded programming and resume presentation of the original programming, that is, the live television programming being viewed prior to initiation of the pause operation. This determination may be based on whether or not the user has selected or otherwise activated the corresponding Resume Live icon 420 on screen 410. If the user does not want to resume the live programming, the process remains in step 522. Otherwise, the process proceeds to step 524, where a stop message is sent to the roaming server and the STB tunes back to the original programming.

Like the process steps shown in FIG. 3, the process steps of the flow diagram of FIG. 5 are presented by way of illustrative example only, and their particular content and sequence may be varied in other embodiments.

As noted above, the foregoing examples assume without limitation that the interrupt processing and trick play functionality are provided for a user at his or her home location 104H. However, the techniques are readily applicable to roaming users, as will now be described in greater detail. For example, a given roaming user accessing a particular roaming channel of his or her roaming profile at remote location 104R can be permitted to pause that channel responsive to displayed interrupt indicators, to resume viewing recorded content from the point of the pause, to initiate various trick play functions based on recording of the paused channel, and to resume live presentation of the channel, in substantially the same manner described above. The remote head end 106B of the system 100 in such an arrangement can obtain the needed roaming channel content from, for example, the home head end 106A, using the techniques described in the above-cited patent applications, or other techniques.

As one example of a roaming implementation of the above-described embodiments, consider an arrangement in which a roaming user is watching roaming content on a laptop computer or mobile telephone. It was previously indicated that such user devices are examples of single devices which combine both an interface device and a presentation device. A given interrupt, such as an email or instant message (IM) is received and a corresponding indicator is presented as previously described. The user can then pause the live video stream, and may resume watching that video stream, as recorded from the point of the pause, at a later time. Alternatively, the user may move to a different location and watch the recorded paused stream from that location. The user may be provided with a list of paused streams that he or she can select from at any given point of time. Such arrangements apply to any type of user interface and presentation devices, such as an STB and television as in the FIG. 3 example.

In roaming implementations such as those described above, the paused content may be stored in any of a number of different ways. For example, such content may be stored locally on the user device, such as the laptop computer or mobile telephone, at a local web server for IP endpoints, at the roaming server or other head end equipment of the remote head end serving the current remote location, at the roaming server or other head end equipment of the home head end serving the home location of the user, etc.

Each of these exemplary storage arrangements has advantages and disadvantages, and various implementation-specific factors may be considered in determining which is the most appropriate for a given implementation. It is to be appreciated, however, that the present invention does not require the use of any of the above-noted storage arrangements, and more generally can make use of any arrangement for storing paused content. For example, those skilled in the art will appreciate that if the storage occurs in head end equipment or elsewhere in a network element of the system 100, various techniques relating to conventional NPVR may be used in storing and subsequently accessing such paused content.

Local storage on a laptop computer or other user device may be appropriate for those embodiments in which trick play functionality is to be provided on the same device that was utilized to pause the live programming. An advantage of such an arrangement is that the trick play functionality can be provided without the use of signaling between the user device and the head end equipment. However, security and content theft are potentially problematic, and the recorded paused content may be lost if the local storage crashes.

Local storage on a web server may be used, for example, in embodiments which use IP endpoints, which may include the above-noted computer, mobile telephone or other user devices, as well as STBs. Advantages include improved security and reduced likelihood of content theft. Also, as in other local storage arrangements, there is no need to transport recorded content from a home head end to the remote head end. Typically, this approach is best suited for embodiments in which trick play functionality is required for a single user session. If trick play functionality is to be supported across user sessions, then the roaming server may store information identifying the web server where the paused content was stored and for a new user session, it may redirect the user to the same web server or redirect the paused content from that web server to another one where the user is currently connected. Thus, if the user moves to a different location, the paused content may need to be backhauled or otherwise transported to the appropriate web server. If the user moves to a non-IP device, such as a television, the paused content may need to be backhauled and reinserted into an appropriate delivery channel.

As noted above, it is also possible to store the paused content at the remote or home head end of the roaming user. Both of these approaches are secure, and likelihood of content theft is minimal.

Storage at the remote head end servicing the roaming user is best suited for embodiments in which trick play functionality is to be provided within that head end domain, since the paused content does not need to be backhauled or otherwise transported from the home head end to the remote head end. Also, for all the users from a given home head end domain that are roaming in a particular remote head end domain, only one stream per channel needs to be transported to the remote head end from the home head end. Also, trick play signals need only be delivered to head end equipment in the remote head end, which improves latency. However, if a user moves from the remote location where the pause operation was initiated to another remote location served by a different head end, the paused content needs to be transported from the recording head end to the new head end currently serving the roaming user. Also, the trick play signals may need to be delivered to the recording head end. It is also possible that different recorded programs for a single user may come from different head ends.

Storage at the home head end of the roaming user is advantageous in that it ensures that all paused content for a given user will be present at a single head end, which simplifies access to multiple recorded programs without regard to the number and type of remote roaming locations that are involved. However, the paused content will need to be backhauled or otherwise transported from the home head end, and the trick play signals will also need to routed from a given remote location bead end to the home location head end.

Again, the particular storage examples outlined above are merely examples. Other embodiments may utilize various combinations of the above storage approaches, or may incorporate other techniques, for example, techniques of a type similar to those used in the context of conventional NPVR.

The above-described embodiments of the invention are intended to be illustrative only. For example, although described in the context of particular signal distribution systems, the invention is not restricted to use in such systems. The described roaming television services techniques can be adapted in a straightforward manner to a wide variety of alternative systems, including cable and satellite television systems, using different arrangements of system elements. As indicated above, the techniques can be applied to a wide variety of subscription media services, including subscription audio services delivered via digital satellite radio, and to other arrangements for delivering signals associated with subscription media services.

Moreover, as was noted previously, the interrupt processing and trick play functionality techniques of the illustrative embodiment do not require roaming, and can be implemented in systems which do not support such roaming.

Further, the media streams that are delivered to a home or remote location on behalf of a given subscriber may include any type of data, including, for example, digital audio, video, speech or other information signals, in any combination.

These and numerous other alternative embodiments within the scope of the following claims will be readily apparent to those skilled in the art.

We claim:

1. A method comprising:
   receiving, at a roaming server of head end equipment, a signal of an incoming interrupt from an interrupt source, the incoming interrupt being directed to an interface device served by the head end equipment;

directing, from the roaming server to the interface device, the incoming interrupt for presentation on a user interface screen, the presentation providing an activatable pause control;

receiving, at the roaming server from the interface device, an instruction to pause live programming currently being provided by the interface device responsive to activation of the activatable pause control;

responsive to receiving the instruction to pause programming, initiating at the roaming server recording of the programming and instructing a media server to start a stream of the programming;

responsive to at least one of the initiating recording of the programming and the starting the stream of the programming, causing at least one of the roaming server and the media server to provide information associated with the stream to the interface device such that the interface device reconfigures the user interface screen to comprise one or more activatable trick play function controls for controlling presentation of the stream;

receiving, at the roaming server from the interface device, a request to resume live programming; and responsive to receiving the request to resume live programming, sending from the roaming server to the interface device the live programming and instructing the media server to stop the stream.

2. The method of claim 1 wherein the information associated with the stream is provided to the interface device by the roaming server.

3. The method of claim 1 wherein the information associated with the stream is provided to the interface device by the media server.

4. The method of claim 1 wherein the stream comprises a Real Time Streaming Protocol (RTSP) stream.

5. The method of claim 1 wherein the media server is implemented internal to the head end equipment.

6. The method of claim 1 wherein the media server is implemented external to the head end equipment.

7. The method of claim 1 wherein instructing the media server to stop the stream further comprises instructing the media server to delete the recorded programming.

8. The method of claim 1 wherein instructing the media server to stop the stream further comprises instructing the media server to store the recorded programming for later viewing.

9. The method of claim 1 further comprising, responsive to receiving the instruction to pause programming, directing, from the roaming server to the interface device, presentation of an activatable resume programming control.

10. An apparatus comprising:
    head end equipment comprising at least one roaming server;
    the roaming server being configured:
       to receive a signal of an incoming interrupt from an interrupt sources, the incoming interrupt being directed to an interface device served by the head end equipment;
       to direct the incoming interrupt to the interface device for presentation on a user interface screen, the presentation providing an activatable pause control;
       to receive from the interface device an instruction to pause live programming currently being provided by the interface device responsive to activation of the activatable pause control;

responsive to receiving the instruction to pause programming, to initiate recording of the programming and to instruct a media server to start a stream of the programming;

responsive to at least one of the initiating recording of the programming and the starting the stream of the programming, to cause at least one of the roaming server and the media server to provide information associated with the stream to the interface device such that the interface device reconfigures the user interface screen to comprise one or more activatable trick play function controls for controlling presentation of the stream;

to receive from the interface device a request to resume live programming; and responsive to receiving the request to resume live programming, to send from the roaming server to the interface device the live programming and instructing to instruct the media server to stop the stream.

11. The apparatus of claim 10 wherein the head end equipment further comprises the media server.

12. The apparatus of claim 10 wherein the media server is implemented external to the head end equipment.

13. A method comprising:

receiving, at an interface device from a roaming server of head end equipment, an incoming interrupt from an interrupt source for presentation on a user interface screen, the presentation providing an activatable pause control;

sending, from the interface device to the roaming server, an instruction to pause live programming currently being provided by the interface device to a presentation device responsive to activation of the activatable pause control, wherein the instruction to pause live programming causes the roaming server to initiate recording of the programming and to instruct a media server to start a stream of the programming;

receiving, at the interface device from at least one of the roaming server and the media server, information associated with the stream responsive to at least one of the initiating recording of the programming and the starting the stream of the programming;

reconfiguring, at the interface device, the user interface screen to comprise one or more activatable trick play function controls for controlling presentation of the stream;

sending, from the interface device to the roaming server, a request to resume live programming; and receiving, at the interface device from the roaming server, the live programming;

wherein the request to resume live programming causes the interface device to instruct the media server to stop the stream.

14. The method of claim 13 wherein the interface device comprises a set-top box.

15. The method of claim 13 wherein the interface device comprises a remote interface device for a roaming subscriber.

16. The method of claim 15 wherein the programming comprises content of a selected one of a plurality of channels of a subscription service available to the roaming subscriber at a home location of the roaming subscriber.

17. The method of claim 13 wherein the information associated with the stream is received at the interface device from the roaming server.

18. The method of claim 13 wherein the information associated with the stream is received at the interface device from the media server.

19. The method of claim 13 wherein the stream comprises a Real Time Streaming Protocol (RTSP) stream.

20. The method of claim 13 wherein the one or more trick play function controls comprise a pause control, a play control, a forward control and a rewind control.

21. An interface device configured to perform the method of claim 13.

* * * * *